United States Patent

[11] 3,587,417

[72] Inventors Jan Jacob Balder;
Johannes Rijnders; Johannes Aloysius Van Leeuwen, Emmasingel, Eindhoven, Netherlands
[21] Appl. No. 769,668
[22] Filed Oct. 22, 1968
[45] Patented June 28, 1971
[73] Assignee U.S. Philips Corporation New York, N.Y.
[32] Priority Nov. 11, 1967
[33] Netherlands
[31] 6715342

[54] EXPOSURE DEVICE FOR MANUFACTURING PICTURE SCREENS FOR CATHODE-RAY TUBES INTENDED FOR THE DISPLAY OF COLOR SCENES
9 Claims, 4 Drawing Figs.

[52] U.S. Cl. ............................................. 95/1
[51] Int. Cl. ............................................. G03b
[50] Field of Search ................................. 95/1

[56] References Cited
UNITED STATES PATENTS
| | | | |
|---|---|---|---|
| 3,395,628 | 8/1968 | Kautz et al. | 95/1 |
| 3,448,667 | 6/1969 | Smithgall | 95/1 |
| 3,476,025 | 11/1969 | Herzfeld | 95/1 |

Primary Examiner—Samuel S. Matthews
Assistant Examiner—Richard M. Sheer
Attorney—Frank R. Trifari ABSTRACT: An exposure device for projecting aperture patterns from a mask onto a photosensitive layer on a carrier used in manufacturing picture screens of cathode-ray tubes. The portions of the photosensitive layers exposed to light harden while unexposed portions do not, and are therefore more easily removable. In the form shown, the device comprises an elongated lamp, a lens for correcting differences between light and electron radiation sources, and an intermediate member having an elongated aperture positioned between the lamp and the lens with the longitudinal axis of the aperture orthogonal to the longitudinal axis of the lamp. Concave, cylindrical mirrors are used to reflect the light so that the actual width of the lamp is effectively increased.

INVENTORS
JAN BALDER
JOHANNES RIJNDERS
JOHANNES A. VAN LEEUWEN
BY
Frank R. Trifari
AGENT

EXPOSURE DEVICE FOR MANUFACTURING PICTURE SCREENS FOR CATHODE-RAY TUBES INTENDED FOR THE DISPLAY OF COLOR SCENES

This invention relates to an exposure device for manufacturing picture screens for cathode-ray tubes intended for the display of color scenes, which device includes a lamp by which a pattern of apertures in a mask is optically projected onto a photosensitive layer of binder provided on a carrier, and wherein a correcting lens is positioned between the lamp and the mask and the light path extending from a light source of the lamp to the correcting lens passes through an aperture in an intermediate member, the light source being elongated and the longitudinal axis thereof being substantially parallel to the plane of the aperture in the intermediate member, the length of this longitudinal axis being greater than any dimension of said aperture measured in a direction parallel to said longitudinal axis.

The carrier above referred to usually is a transparent glass plate which forms part of the future picture screen for a cathode-ray tube as specified. A carrier (possibly with a layer thereon) of a future picture screen is sometimes referred to as "face plate."

The cathode-ray tube mentioned in the preamble is, for example, a color television display tube, but may alternatively be, for example, a tube which is connected to a switchboard, in which event this combination is used for designing color patterns.

The term "light source of a lamp" is to be understood to mean a member inside the lamp which radiates light, for example, a filament of an incandescent lamp, or part of a lamp in which a discharge takes place, for example, that portion of the discharge space of a gas-discharge lamp which coincides with the arc.

The apertures in the mask may be light-transmitting apertures of circular shape, rectangular shape, etc.

A cathode-ray tube for the display of color scenes usually includes an electrode system which provides several electron beams the electrons of which travel along different paths through the apertures in a mask towards the screen for producing so-called basic colors. These usually are the colors green, red and blue. To this end, the screen usually has a very large number of so-called "dots" a certain number of which contains a luminescent substance which, when struck by electrons, radiates light of one of the basic colors (for example green); other dots on the screen obtain a luminescent substance which, when struck by electrons, radiates light of one of the other basic colors (for example red). A third group of dots may contain, for example, a substance of blue luminescence. However, it is not necessary for the different kinds of dots and the number of electron beams to be three. For cathode-ray tubes intended for special purposes, this number could be chosen, for example, to be two or more than three.

The said screen usually comprises a collection of a very large number of "groups" of dots. One group of dots consists of a combination of dots of different compositions.

Each electron beam scans (through the mask) only the dots of one and the same composition. Other colors may be visualized on the screen by varying the ratio between the intensities of the electron beams.

It is known to provide the said dots on the screen by means of a process in which a layer provided on the face plate, which layer contains a luminescent substance and a photosensitive lacquer, is exposed through the mask (color-selection mask) to light rays striking the screen at areas where the electrons of one of the electron beams will strike the screen afterwards. The exposure causes the luminescent material to be adhered to the screen at these areas. The material at the unexposed areas of the screen may be rinsed away so that the dots subsist. At a subsequent stage of manufacture the face plate is covered with a layer of a different luminescent material but also provided with a photosensitive lacquer. This new layer is exposed at areas such that the new "dots" come at the areas which will be struck afterwards by the second electron beam. Consequently the last-mentioned dots do not lie at the same areas as the dots provided earlier. This process may, if necessary, be repeated for a third layer, and so forth. The "exposure" is always effected with a radiation to which the photosensitive binder is responsive. This may be, for example, visible radiation or, for example, ultraviolet light. It is also possible to "expose" a layer which contains only the photosensitive binder and to provide the luminescent material at a later stage.

A disadvantage of a known device of the kind mentioned in the preamble is the presence of a conical element in the aperture in the intermediate member. This results in a low optical efficiency. Although screens of satisfactory quality can be manufactured with this known device, the required period of exposure is comparatively long as a result of the low optical efficiency.

An object of the invention is to obviate or at least reduce this disadvantage.

An exposure device according to the invention for manufacturing picture screens for cathode-ray tubes intended for the display of color scenes, which device includes a lamp by which a pattern of apertures in a mask is optically projected onto a photosensitive layer of binder provided on a carrier, and wherein a correcting lens is positioned between the lamp and the mask and the light path extending from a light source of the lamp to the correcting lens passes through an aperture in an intermediate member, the light source being elongated and the longitudinal axis thereof being substantially parallel to the plane of the aperture in the intermediate member, the length of this longitudinal axis being greater than any dimension of said aperture measured in a direction parallel to said longitudinal axis, is characterized in that the aperture is elongated and the longitudinal axis thereof is substantially at right angles to the longitudinal axis of the light source, the longitudinal axis of the aperture having a length such that substantially the same apparent width of the light source is seen from any point of the correcting lens lying in a flat plane at right angles to the axis of the light source.

The term "apparent width of the light source seen from a point of the correcting lens" is to be understood to mean the apparent dimension of the light source in a plane at right angles to the longitudinal axis of the light source and at right angles to the direction of viewing (viewing from the point on the correcting lens towards the aperture). If the number of correcting lenses is two or more, the term "seen from the correcting lens" is to be understood to mean "seen from that correcting lens which is closest to the aperture." In the absence of mirrors, etc. the apparent width of the light source is equal to the actual width of the light source.

An exposure device according to the invention affords the advantage that the optical efficiency can be high and hence the exposure time very short, for example, of the order of 1 minute (before the invention this was about 4 minutes or longer). The short exposure time can now be achieved because a conical element in the aperture in the intermediate member is now no longer required. A device according to the invention nevertheless permits of manufacturing screens of satisfactory quality. This is a surprising fact since use is made of a part of the light source which is actually not circular. When using conventional masks having circular holes substantially circular dots are yet obtained on the screen.

The elongated shape of the aperture is chosen to ensure in flat planes at right angles to the longitudinal axis of the light source, an adequate radiation of light in lateral directions, that is to say adequate with respect to the radiation of light towards the center of the correcting lens. For the same reason the apparent width of the light source, as above referred to, is also for lateral directions substantially equal to that when viewed from the center of the correcting lens.

The aperture in the intermediate member may be an aperture in an intermediate member situated outside the lamp. It is alternatively possible that the intermediate member forms part of the lamp itself.

The distance between the light source and the aperture may be very small, for example, if the intermediate member forms part of the lamp or if the lamp is a surface radiator. However, surface radiators usually have a comparatively low brightness, resulting in a comparatively long exposure time.

If the distance between the light source and the aperture is in the order of at least a few millimetres (this case usually occurs when using a simple lamp with no internal intermediate member) use is preferably made of the preferred solution given hereinafter.

With a preferred solution another correcting lens in addition to that previously mentioned is arranged between the aperture and the mast, one of the correcting lenses satisfying the condition that its optical strength is more positive in at least a flat plane. A passing through the longitudinal axis of the light source and the center of this lens than in a flat plane B which is at right angles to the longitudinal axis of the light source and likewise passes through the center of this lens.

The term "more positive" is to be understood to mean more convergent (usually convexer section of lens) or less divergent (less concave section of lens).

Such a lens permits to bring the virtual image of the light source in at least the plane A closer to the virtual image of the light source in the plane B. Without this correction, the light source in the plane A apparently finds itself at the level of the center of the aperture, whereas the apparent position of the light source in the plane B coincides with the actual position of the light source. This may give rise to incorrect location of certain series of dots on the screen. Such a difference in position of the virtual light source usually also occurs for other flat planes, such as, for example, a bisector plane of A and B. Good correction appears to be possible if at least the mutual positions of the virtual images of the light sources in the planes A and B are brought closer to each other.

If the cross section of the correcting lens is, for example, concave in plane B and planoparallel in plane A (this also means more positive) the virtual image of the light source in plane B is displaced towards that in plane A. The reverse occurs if, for example, the cross section of the correcting lens is planoparallel in plane B and convex in plane A.

While the last-mentioned lenses provide a correction for the light source itself, the correcting lenses coacting therewith give a correction for inter alia the different behavior of light rays on the one hand and electron rays (deflected by coils) in the future cathode-ray tubes on the other hand.

An advantage of this preferred solution is that the dots are formed on the screen less far from the locations most desirable for them.

Preferably, in an exposure device according to the invention, the correcting lens, which is more positive in plane A than in plane B is combined with the correcting lens coacting therewith for the correction of light rays-electron rays. This combination may imply that the two correcting lenses are either fastened together or completely form a unit. This provides a simpler arrangement.

It is naturally possible that, if the number of correcting lenses is two or more, the two correcting functions mentioned hereinbefore are not strictly separate.

With masks having circular holes, the shape and size of a dot on the screen depend inter alia upon the apparent width of the light source. To obtain dots which satisfy the requirements imposed, the apparent width of the light source must therefore have a very special value which usually differs from the actual widths of the light sources available.

In exposure device according to the invention a concave mirror is preferably present on the side of the light source remote from the aperture, which mirror comprises two substantially identical cylindrical portions the boundary region of which lies in a flat plane passing through the center of the aperture in the intermediate member and the longitudinal axis of the light source, the two mirror portions throwing light towards the correcting lens (correcting lenses) in such manner that the apparent width of the light source is greater than the actual width of the light source.

This preferred solution has the advantage that it is now also possible to use light sources of comparatively small widths.

In one advantageous embodiment of the device according to the invention the aperture in the intermediate member, as viewed from the correcting lens, is substantially rectangular.

An advantage of this embodiment is that it can be manufactured in a simple manner.

With a preferred solution of the last-mentioned embodiment the aperture in the intermediate member is formed by a recess in a cylindrical part of the intermediate member, the axis of this cylindrical part coinciding with the longitudinal axis of the light source.

An advantage of this solution is that very good lateral radiation of light can thus be obtained.

The correcting lens which is more positive in plane A than in plane B is preferably a cylindrical lens.

This has the advantage that with this simple lens also a certain correction of the position of the virtual light source in planes other than A and B can be obtained.

If the cylindrical lens is concave its optical strength in plane B is preferably a dioptric, so that:

$$a = -\frac{1}{p} + \frac{1}{p+h}$$

where:

$p$ is the distance (in metres) between the optical center of the concave cylindrical lens and the center of the aperture;

$h$ is the distance (in metres) between the center of the aperture and the center of the light source.

In this case the lens corrects the position of the virtual image of the light source in plane B almost completely so that this image substantially coincides with the image in plane A. Now the other correcting lens can be of a conventional type.

In order that the invention may be readily carried into effect it will now be described in detail, by way of example, with reference to the accompanying diagrammatic drawings, in which.

Figure 1:
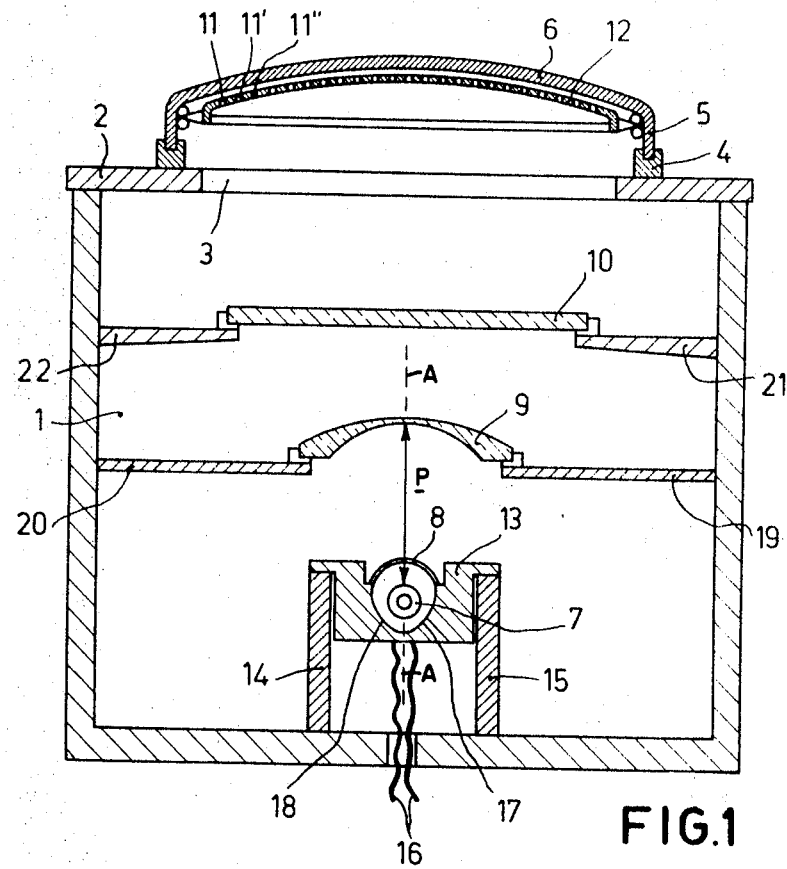
FIG. 1 is a sectional view of an exposure table according to the invention.

In FIG. 1 is a compartment of approximately 1 metre height, which is covered at the top by a closure plate 2 provided with an aperture 3. On the other side of plate 2 is an annular collar 4 surrounding the aperture 3 and provided at its upper side with a groove 5. A face plate 6, which will form the future screen of a color-television display tube, bears in the groove 5. The side of face plate 6 adjacent the aperture 3 is coated with a layer (not shown) containing a luminescent material and a photosensitive lacquer. The groove 5 permits of accurate centering of the face plate relative to the aperture 3 and hence adjustment of the correct position of face plate 6 relative to a high-pressure mercury-vapor discharge lamp 7 (of 900 watts) which is rigidly arranged in compartment 1. The light from this lamp is radiated towards a correcting lens 9 through an aperture in an intermediate member 8 (see FIGS. 2 to 4 for details relating to the intermediate member). This light is subsequently projected onto the screen (face plate) 6 by correcting lens 9, a correcting lens 10, and via the aperture 3 through holes 11, 11', 11'', etc. in a mask 12. The intermediate member 8 is supported by a holder 13 which bears on two vertical brackets 14 and 15. The lamp is fed via supply wires 16. FIG. 1 is a cross-sectional view at right angles to the longitudinal axis of the light source 7. Mirrors 17 and 18 are arranged on the side of lamp 7 remote from the aperture in the intermediate member 8. If desired, a light filter may be placed between correcting lens 10 and mask 12 for further improvement of the light distribution.

The correcting lens 9 has a concave cross section in the plane of FIG. 1 and a planoparallel cross section in a plane passing through the axis of the light source. It is a hollow circular cylinder. The lens 9 serves to bring the virtual image of the light source of lamp 7 in the plane of FIG. 1 and the corresponding virtual image in a plane passing through the longitudinal axis of the light source and at right angles to the plane of FIG. 1 closer to each other. The correcting lens 10 is a conventional correcting lens for correcting the different behavior of light rays on the one hand and (deflected) electron rays on the other hand.

Supports 19, 20 and 21, 22 serve to hold the lenses 9 and 10, respectively, in position.

Figure 2:
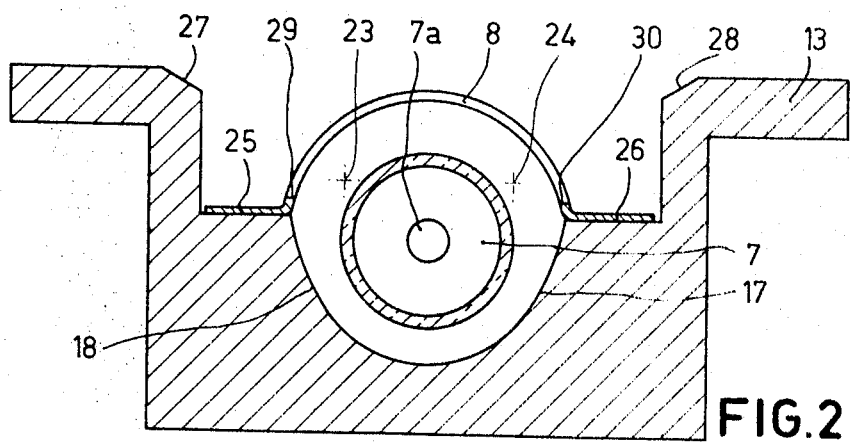
FIG. 2 is a sectional view on a large scale of a light source, an intermediate member, and a holder therefor, of the exposure table of FIG. 1.

FIG. 2 shows the holder 13 for the intermediate member 8 of FIG. 1 on a larger scale. In FIG. 2 the light source of the lamp 7 i.e. the arc of the discharge, is indicated by 7a. The mirrors are provided with the same reference numerals as in FIG. 1. The centers (centerlines) of the mirrors 17 and 18 are indicated by 23 and 24 respectively. There were the mirrors meet (boundary region) the centerline of the mirrors coincide with the longitudinal axis of the light source 7a. Two flat tongues 25 and 26 of the intermediate member 8 bear on flat parts of the holder 13. The tongues 25 and 26 are secured to the holder 13, for example, by welding. Inclined portions 27 and 28 of the intermediate member and portions 29 and 30 of the holder 13 serve to prevent the light from being radiated in undesired directions.

Figure 3:
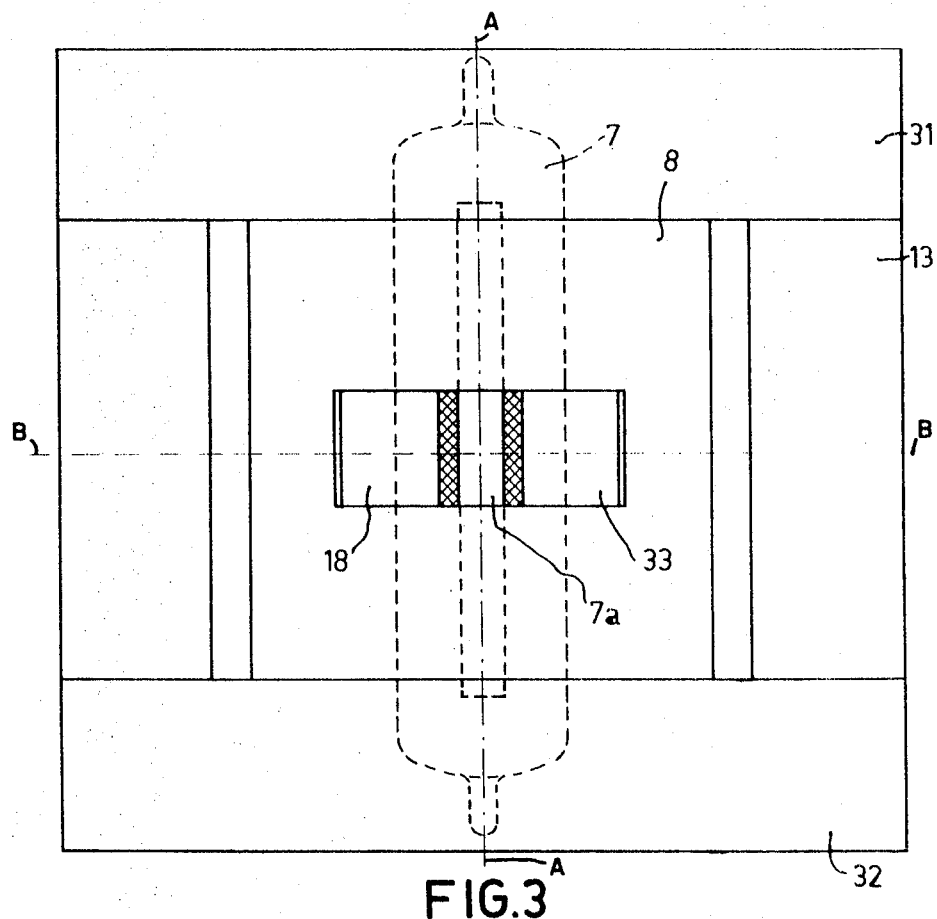
FIG. 3 is a plan view on the light source, the intermediate member and the holder of FIG. 2.

FIG. 3 is a plan view on the holder 13, the intermediate member 8 and the lamp 7, and two cover plates 31 and 32. The aperture in the intermediate member 8 is indicated by 33. In this plan view, the aperture 33 has a rectangular shape and hence also when viewed from the correcting lens 9. This aperture is such that its short side is shorter than the longitudinal axis of the light source 7a and, furthermore, its longitudinal axis (at right angles to the axis of the light source, see also FIG. 2) which almost forms a half circle is longer than the short axis just mentioned. Two double cross-hatched strips can be seen through the aperture, which strips represent diagrammatically the light radiated by the light source 7a and reflected by the mirrors 17 and 18. The apparent width of the light source is to be understood in this case to mean the sum of the width of the light source 7a together with the sum of the widths of the double cross-hatched strips. FIGS. 2 and 3 also show that the curved longitudinal axis of aperture 33 has a length such that the apparent width of the light source is not reduced by the boundary lines of aperture 33 for viewing angles which are inclined to some extent.

Figure 4:
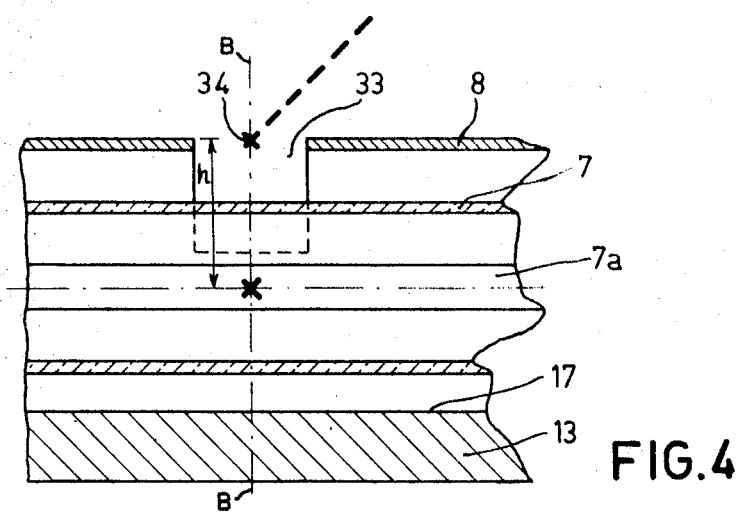
FIG. 4 shows a longitudinal section of a part of the intermediate member, the light source and a mirror of the exposure table of FIG. 1.

In FIG. 4 a portion of the intermediate member is again indicated by 8. 33 is the aperture in the intermediate member, 7a is the light source and 7 the complete mercury lamp, 17 is one of the mirrors of the lighting table of FIG. 1.

From FIG. 4 it can be seen that the apparent position of the light source in this plane of the drawing, through the longitudinal axis of the light source 7a, lies at 34. In the plane of the FIGS. 1 and 2, however, the apparent position of the light source corresponds to its actual position, that is to say at the center of 7a. The lens 9 (see FIG. 1) serves slightly to lift the image of the light source in the plane of FIG. 2 (plane B) so that this image substantially coincides with the image at point 34 of FIG. 4 (plane A).

In one embodiment the light source 7a had a length of 17 mm. and a width of 2 mm. Its brightness was approximately 30 kilo stilb. The dimensions (measured in the flat plane) of the rectangular aperture 33 of FIG. 3 were approximately 10 mm. ×4 mm., the lens 9 had an optical strength of −3.5 dioptrics in the plane B, and the distance between the light source 7a and the lens 9 was approximately 45 mm. The virtual image of the light source in plane B was therefore lifted by approximately 5 mms. In this embodiment the dots on the screen were, after an exposure time of approximately 1 minute 400 $\mu$ with a deviation of approximately 20 $\mu$. This quality of the dots-dimensions is substantially equal to that obtained with an exposure table which is provided with a conical element.

The important advantage of the table described is, however, that the exposure time is much shorter than for a table provided with a conical element. Compared to the situation before the invention (exposure time 4 minutes) the exposure time is now reduced to approximately one quarter of the exposure time in the old situation.

I claim:

1. An exposure device for projecting aperture patterns from a mask onto a photosensitive layer on a picture screen for cathode-ray tubes comprising, a lamp having an elongated light source with a longitudinal axis lying in a plane substantially parallel to said mask, first lens means, for correcting optical errors normally introduced by using said light source in place of an electron source, positioned between said light source and said mask, and an intermediate member having an elongated aperture positioned between said light source and said optical means near said light source, said aperture having a longitudinal axis orthogonal to the longitudinal axis of light source and lying in a plane substantially parallel to said plane of said light source, said light source having dimensions parallel to the longitudinal axis thereof greater than any dimension of said aperture measured in a direction parallel to the longitudinal axis of said aperture, said dimension of said aperture having a length at which substantially the same apparent width of said light source is seen from any point of said correcting lens lying in a plane orthogonal to the longitudinal axis of said light source.

2. An exposure device as claimed in claim 1 further comprising a second correcting lens positioned near said aperture for providing uniform lateral light radiations from said aperture, compensating for differences between positions of said light source and said aperture.

3. An exposure device as claimed in claim 2 wherein said first and second correcting lenses together form a unit.

4. An exposure device as claimed in claim 1 comprising, a concave mirror positioned on the side of the said light source remote from said aperture, said mirrors comprising at least two substantially identical cylindrical parts having boundary regions lying in planes passing through the center of said aperture and the longitudinal axis of said light source, said mirrors reflecting light towards said optical correcting means in such manner that an apparent width of said light source is greater than an actual width of said light source.

5. An exposure device as claimed in claim 2 wherein said aperture in the intermediate member as viewed from said second correcting lens is substantially rectangular.

6. An exposure device as claimed in claim 1 wherein said aperture in the intermediate member is formed by a recess in a cylindrical part of the intermediate member having a longitudinal axis substantially coinciding with the longitudinal axis of said light source.

7. An exposure device as claimed in claim 2 wherein said second correcting lens converges light rays lying in a plane orthogonal to said first lens and passing through the longitudinal axis of said light source more than light rays lying in a plane orthogonal to said second lens and passing through an axis orthogonal to the longitudinal axis of said light source.

8. An exposure device as claimed in claim 6 wherein said second lens is a cylindrical lens.

9. An exposure device as claimed in claim 7 wherein said cylindrical lens is concave so that the optical strength of light rays lying in a plane orthogonal to said first lens and passing through an axis orthogonal to the longitudinal axis of said light source is a dioptric, so that $$a = -\frac{1}{p} + \frac{1}{p+h}$$

where: $p$ is the distance in meters between the optical center of the concave cylindrical lens and the center of the aperture; and $h$ is the distance in meters between the center of the aperture and the center of the light source.